June 12, 1956  E. F. HISCOCK  2,749,834
MEANS FOR BREWING POT COFFEE
Filed May 20, 1953
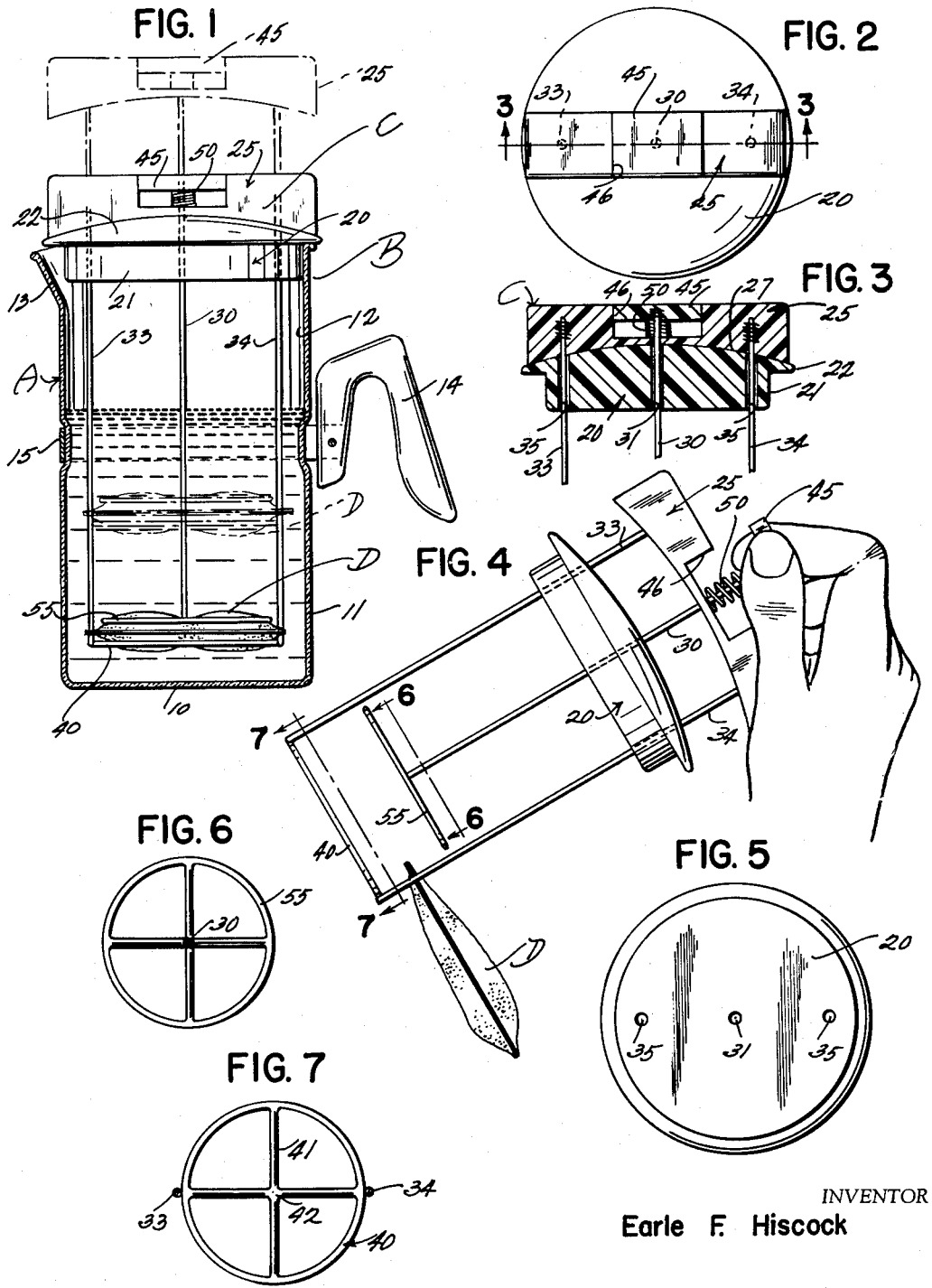
INVENTOR
Earle F. Hiscock

United States Patent Office 2,749,834
Patented June 12, 1956

2,749,834

MEANS FOR BREWING POT COFFEE

Earle F. Hiscock, Chatham, Mass., assignor to Kip, Inc., Chatham, Mass., a corporation of Delaware Application May 20, 1953, Serial No. 356,140

3 Claims. (Cl. 99—287)

This invention relates to improvements in coffee makers for pot brewing of coffee.

It is the primary purpose of this invention to provide an improved pot type coffee maker with improved means for supporting and maintaining a packet of ground coffee in proper position and in such relation within water of a pot type container so as to enable brewing of delicious coffee with the maximum amount of soluble aromatic constituents of the coffee, and under such conditions that the coffee liquor will be clear and free of the clouding portions of the grind referred to be in the art as "mud."

A further object of this invention is the provision of an improved appliance adapted to be used in connection with coffee pots for supporting a flexible packet of ground coffee in such position in the pot and under such circumstances that the maximum amount of soluble aromatic portions of the ground coffee may be extracted.

A further object of this invention is the provision of a sanitary and clean system of effectively and quickly brewing pot coffee through the use of a disposable flexible and porous packet of ground coffee.

Other objects and advantages of this invention will be apparent during the course of the following detailed description.

In the accompanying drawing, forming a part of this specification, and wherein similar reference characters designate corresponding parts throughout the several views:

Figure 1 is a vertical cross sectional view through a pot type receptacle having coffee packet supporting appliance associated therewith.

Figure 2 is a plan view of the said appliance.

Figure 3 is a fragmentary cross sectional view taken through the upper portion of the coffee packet holding appliance.

Figure 4 shows in side elevation how an operator can manipulate the appliance for the efficient removal of a coffee packet after coffee has been brewed, the operation being such that the individual need not directly touch the soggy packet.

Figure 5 is a bottom plan view of the appliance cover, adapted to rest upon the top of a pot.

Figures 6 and 7 are cross sectional views taken on the respective lines 6—6, and 7—7, shown in Figure 4 of the drawings, and more particularly showing the bag clamping portions of the appliance.

In the accompanying drawing, wherein for the purpose of illustration is shown only a preferred embodiment of the invention, the letter A may generally designate the improved coffee maker. It may comprise a conventional shaped pot B adapted to receive the improved appliance C for supporting a flexible packet D.

The coffee packet D is preferably of the type described and claimed in my copending application Serial 281,354 filed April 9, 1952. The packet material is preferably woven viscose rayon which has been desized. The coffee disposed therein is preferably of a particular grind produced in a granulizer such as manufactured by B. F. Gump Co. of Chicago, Illinois, which has been found to provide a clean cut granulized coffee free of much of the fines and dust present in conventionally ground coffee; the particles will receive a rapid and full washout of the voluble aromatic constituents under the method employed in brewing pot coffee as herein set forth. The coffee is placed in a measured amount in the packet D, sufficient for the brewing in the pot B of a predetermined number of cups of coffee. This will give uniformity of quality and strength to the coffee. The packet has a somewhat flattened shape when filled.

The pot B may be of any shape and size, but preferably includes a bottom 10 having upstanding walls 11, the compartment 12 being entirely open at the top. It may have a pouring spout 13 if so desired. A handle 14 of heat insulating material may be clamped by band, as at 15, upon the container. The location of the band may serve to indicate the level of water in the pot necessary to brew the required number of cups of coffee.

The material of the receptacle B is optional. It may be of heat resistant glass or plastic, or metal such as Monel, aluminum, stainless steel, etc.

The appliance C preferably includes a cover 20, the body 21 of which is adapted to fit any opening at the top of the receptacle B, as indicated in Figure 1; the body 21 being flanged at 22 for resting on the top edge of the receptacle. This cover 20 may be of insulating material, such as plastic, etc.

A plastic handle 25, forming part of the appliance C is shaped to fit over the top of the cover 20. The top surface of the cover C is convexed, as indicated at 27. The handle 25 has its lower surface convexed to fit the contour of the cover as shown in Figure 3. A central clamp supporting rod 30 is slidably carried by a portion of the handle 25. The rod 30 extends slidably through a suitable opening 31 centrally or axially in the cover 20.

The upper ends of the rods 33 and 34 are molded or screw threaded into the handle body, and their lower ends are provided with a bag or packet clamping member 40 in the shape of a ring, as shown in Figure 7. This ring has radial spokes 41 meeting at a hub 42. This flat clamping member could be any sufficiently perforated disc to permit free circulation and passage of the coffee liquor through the packet D. The rod 30 is molded or otherwise connected to a finger engaging head or packet releasing member 45 socketed in a top opening 46 of the handle 25. Head 45 is normally collapsed in the socket 46 by means of tension spring 50 secured at one end to the member 45 and at its opposite end to the handle 25. The rod 30 slides freely through both the handle 25 and cover 20, and at its lower or inner end it is provided with a clamping member 55 similar to the clamping member 40.

The rods 30, 33 and 34 may be of any approved material, such as synthetic plastic, Monel metal, stainless steel etc.

The packet D is intended to be clamped between the members 40 and 55, as is shown in Figure 1 of the drawing.

In the position shown in Figure 1 the packet and the clamping members are raised slightly off of the bottom wall 10 of the receptacle when the cover is in place. This will prevent the operator from too forcefully squeezing the packet as it is lowered into the receptacle during the brewing action, as will be subsequently mentioned.

In Figure 4 it is shown that an operator with one hand can release a packet D by merely lifting the fingerpiece 45 against tension of the spring 50 to move the clamping members 40 and 55 away from each other.

In my copending applications Serial Nos. 142,670, filed February 6, 1950; 174,465, filed July 18, 1950; 279,520, filed March 31, 1952, and 342,190, filed March 13, 1953, I have shown coffee packets as used in connection with a vacuum type coffee maker. Under such circumstances of use it is desirable to have a slight squeezing action of the packet during the brewing of the coffee, particularly during the sweep of the liquor through the coffee maker tube between the compartments of the receptacle. However, the situation is somewhat different in the case of the brewing of pot coffee.

In tests for the brewing of pot coffee using the packet D containing ground coffee I have experimented with a manual pressing action upon the packet by means of a pestle. It appears that under such conditions the pressing or squeezing action cannot be properly pressure controlled and the result is that too much sediment is discharged from the packet into the liquor. For that reason I have arranged the holddown device so that it will maintain the packet in horizontal position above the bottom of the receptacle. The brewing action is enhanced by raising and lowering of the packet through operator control.

It is to be noted that with the present invention all of the coffee is entirely submerged at all times. This is in contradistinction to ordinary pot coffee brewing wherein coffee granules float upon top of the liquor and much of the aromatic qualities are lost.

In operation the packet is placed between the clamping members 40 and 55. The receptacle is filled to the desired level with water and the water brought to a boil. Immediately thereafter and subsequent to removal of heat from the receptacle the appliance is lowered into the receptacle to submerge the packet in the boiled water. The appliance is moved vertically during the brewing action and the liquor will pass through and also rinse the bag thoroughly to speed up extraction and wash out the right amount of suspended matter without a too free discharge of objectionable constituent parts which tend to mud the liquor. The horizontal plane in which the bag is held between the reticulated rings 40 and 55 and marginally spaced from the inner side walls of the container body 11 insures that an operator can easily reciprocate the bag in proper position for securing maximum extraction of the flavorable contents of the coffee from the packet. The unimpaired quality of the coffee obtained is possible because of the porosity of the material of which the bag is formed and its filtering ability, together with the right amount of right kind of grind of coffee, and the brewing movement imparted to the appliance during the making of the coffee. The coffee liquor should not be boiled, as experts well know, and for that reason the reciprocating motion of the packet through the coffee liquor, first in one direction and then the other speeds up and enhances the proper extraction of the aromatic qualities.

Various changes in the shape, size and arrangement of parts may be made to the form of invention herein shown and described without departing from the spirit of the invention or scope of the claims.

I claim:

1. A beverage maker for the brewing of materials such as tea and coffee, comprising a receptacle for receiving a liquid, a closure engaging the top of the receptacle and positioned against loose tilting, a handle having rod means slidably extended through said closure whereby the handle may be moved away from the closure, a packet clamping member carried by the rod means at the opposite side of the handle with respect to the closure and materially spaced from the handle, a rod means slidably mounted on said handle and movable with respect to said closure, a clamping member mounted upon said last mentioned rod means in proximity to the first mentioned clamping member, a finger engaging piece fixed upon said rod means last mentioned above the handle, a spring connected to said finger engaging piece and to said handle normally contracted to hold the finger engaging piece close to the handle and thereby positioning the clamping member upon said last mentioned rod means for the releasable clamping of a packet of fusible material between the two clamping members.

2. A beverage maker as defined in claim 1 in which the clamping members are positioned in planes at right angles to the normal axis of the closure for the clamping of the packet in substantially horizontal position therebetween.

3. A beverage maker as described in claim 1 in which the two have large openings therein whereby the packet will have large areas exposed above and below the clamping members when the packet is clamped therebetween.

References Cited in the file of this patent

UNITED STATES PATENTS

| | | |
|---|---|---|
| 177,173 | Theobald | May 9, 1876 |
| 376,319 | Lane | Jan. 10, 1888 |
| 417,168 | Giles | Dec. 10, 1889 |
| 519,108 | Fontneau | May 1, 1894 |
| 674,456 | Darden | May 21, 1901 |
| 1,631,486 | Hyde | June 7, 1927 |
| 1,636,727 | Willner | July 26, 1927 |
| 1,797,672 | Paolini | Mar. 24, 1931 |
| 2,078,561 | Cavalletti | Apr. 27, 1937 |
| 2,123,054 | Lamb et al. | July 5, 1938 |
| 2,285,113 | Eaton | June 2, 1942 |
| 2,324,195 | Carlson et al. | July 19, 1943 |
| 2,511,929 | Marquis | June 20, 1950 |
| 2,678,000 | Scheidt et al. | May 11, 1954 |

FOREIGN PATENTS

| | | |
|---|---|---|
| 6,079 | Australia | Feb. 13, 1933 |
| 11,127 | Great Britain | 1887 |
| 22,650 | Great Britain | 1910 |
| 569,372 | Germany | Feb. 1, 1933 |